(12) United States Patent
Petch et al.

(10) Patent No.: US 7,867,299 B2
(45) Date of Patent: Jan. 11, 2011

(54) METHODS, APPARATUS, AND SYSTEMS FOR PRODUCING HYDROGEN FROM A FUEL

(75) Inventors: Michael Ian Petch, Reading (GB); Jonathan Charles Frost, Henley-on-Thames (GB); Suzanne Rose Ellis, Reading (GB); Jessica Grace Reinkingh, Malvern, PA (US); Mark Robert Feaviour, Reading (GB); Jillian Elaine Bailie, Reading (GB); David Wails, Reading (GB); Paul James Millington, Reading (GB)

(73) Assignee: GM Global Technology Operations LLC, Detroit, MI (US)

(*) Notice: Subject to any disclaimer, the term of this patent is extended or adjusted under 35 U.S.C. 154(b) by 917 days.

(21) Appl. No.: 11/070,919

(22) Filed: Mar. 3, 2005

(65) Prior Publication Data
US 2005/0172555 A1 Aug. 11, 2005

Related U.S. Application Data

(62) Division of application No. 10/304,561, filed on Nov. 26, 2002, now Pat. No. 7,105,148.

(51) Int. Cl.
*B01J 8/00* (2006.01)

(52) U.S. Cl. ............... 48/127.9; 48/61; 48/85; 48/75; 48/63; 48/93; 48/94; 48/128; 48/214 R; 48/215; 422/187; 422/188; 422/189; 422/190; 422/211; 422/177; 422/171; 422/172; 422/170; 429/17; 429/19; 429/20; 252/373; 252/376; 502/439

(58) Field of Classification Search ............... 422/188, 422/189, 190, 211, 222
See application file for complete search history.

(56) References Cited

U.S. PATENT DOCUMENTS

| 1,826,974 A | | 10/1931 | Williams |
| 2,119,565 A | | 6/1938 | Williams |
| 2,898,290 A | | 8/1959 | Swabb, Jr. |
| 3,965,252 A | * | 6/1976 | Kmecak et al. ............. 423/651 |
| 4,499,205 A | | 2/1985 | Masuda |
| 4,501,823 A | * | 2/1985 | Masuda ..................... 502/304 |
| 4,755,498 A | | 7/1988 | Setzer et al. |

(Continued)

FOREIGN PATENT DOCUMENTS

DE 3415634 A1 10/1984

(Continued)

*Primary Examiner*—Alexa D. Neckel
*Assistant Examiner*—Kaity V. Handal
(74) *Attorney, Agent, or Firm*—Dinsmore & Shohl LLP

(57) ABSTRACT

Methods and apparatus for producing hydrogen with reforming catalysts. The reforming catalysts may be platinum group metals on a support material, and they may be located in a reforming reaction zone of a primary reactor. The support material may be an oxidic support having a ceria and zirconia promoter, or may include a neodymium stabilizer. The support material may also include at least one Group IA, Group IIA, manganese, or iron metal promoter. The primary reactor may have a first and second reforming reaction zones, where upstream catalysts located in the first reforming reaction zone and downstream catalysts located in the second reforming reaction zone may be selected to perform optimally under the conditions in their respective reforming reaction zone.

27 Claims, 3 Drawing Sheets

U.S. PATENT DOCUMENTS

| | | | |
|---|---|---|---|
| 4,927,857 A | 5/1990 | McShea, III et al. | |
| 5,023,276 A * | 6/1991 | Yarrington et al. | 518/703 |
| 5,130,114 A | 7/1992 | Igarashi | |
| 5,993,619 A | 11/1999 | Bloomfield et al. | |
| 6,143,159 A | 11/2000 | Bloomfield et al. | |
| 6,245,303 B1 | 6/2001 | Bentley et al. | |
| 6,284,398 B1 | 9/2001 | Kiryu | |
| 6,348,278 B1 | 2/2002 | LaPierre et al. | |
| 6,423,435 B1 | 7/2002 | Autenrieth et al. | |
| 6,436,363 B1 | 8/2002 | Hwang et al. | |
| 6,455,182 B1 | 9/2002 | Silver | |
| 6,458,334 B1 | 10/2002 | Tamhankar et al. | |
| 6,521,204 B1 | 2/2003 | Borup et al. | |
| 6,524,550 B1 | 2/2003 | Chintawar et al. | |
| 6,566,573 B1 | 5/2003 | Bharadwaj et al. | |
| 6,616,909 B1 | 9/2003 | Tonkovich et al. | |
| 6,624,116 B1 | 9/2003 | Bharadwaj et al. | |
| 6,627,572 B1 | 9/2003 | Cai et al. | |
| 6,695,983 B2 | 2/2004 | Prasad et al. | |
| 6,777,117 B1 | 8/2004 | Igarashi et al. | |
| 6,793,698 B1 * | 9/2004 | Sanger et al. | 48/127.9 |
| 6,899,861 B2 | 5/2005 | Burch et al. | |
| 6,916,458 B2 | 7/2005 | Kushida et al. | |
| 6,919,062 B1 | 7/2005 | Vasileiadis et al. | |
| 7,025,903 B2 | 4/2006 | Grieve et al. | |
| 2001/0008621 A1 | 7/2001 | Christensen et al. | |
| 2002/0009408 A1 | 1/2002 | Wieland et al. | |
| 2002/0028744 A1 | 3/2002 | Petit-Clair et al. | |
| 2002/0042341 A1 * | 4/2002 | Golden | 502/303 |
| 2002/0059753 A1 | 5/2002 | Ichikawa | |
| 2002/0063001 A1 | 5/2002 | Lennevi | |
| 2002/0088179 A1 | 7/2002 | Lesieur et al. | |
| 2002/0088740 A1 | 7/2002 | Krause et al. | |
| 2002/0094310 A1 | 7/2002 | Krause et al. | |
| 2003/0180215 A1 | 9/2003 | Niu et al. | |
| 2004/0184985 A1 | 9/2004 | Anzai et al. | |
| 2004/0191165 A1 | 9/2004 | Anzai et al. | |
| 2005/0261383 A1 | 11/2005 | Xie et al. | |

FOREIGN PATENT DOCUMENTS

| | | |
|---|---|---|
| EP | 0112613 A | 7/1984 |
| EP | 0206535 A1 | 12/1986 |
| EP | 0967174 A1 | 12/1999 |
| EP | 0968958 A | 1/2000 |
| EP | 1010462 A | 6/2000 |
| GB | 2247465 A | 3/1992 |
| WO | 9948805 A1 | 9/1999 |
| WO | WO 01/25141 A | 4/2001 |
| WO | WO 01/76731 A | 10/2001 |
| WO | 0220395 A2 | 3/2002 |

* cited by examiner

METHODS, APPARATUS, AND SYSTEMS FOR PRODUCING HYDROGEN FROM A FUEL

CROSS REFERENCE TO RELATED APPLICATIONS

This application is a division of U.S. patent application Ser. No. 10/304,561, filed Nov. 26, 2002.

BACKGROUND OF THE INVENTION

The present invention relates generally to the production of hydrogen from fuel and more particularly to primary reactors and methods for reforming hydrocarbons.

Many fuel cell systems use a fuel processing system to break down the molecules of a primary fuel to produce a hydrogen-rich gas stream capable of powering the fuel cells. The fuel processing systems generally have a primary reactor or reformer in which hydrocarbons are initially broken down into various product gases including hydrogen.

In one type of reactor a steam reforming reaction is carried out by reacting a hydrocarbon fuel at high temperatures in the presence of steam on a suitable catalysts to give hydrogen, carbon monoxide, and carbon dioxide. The reaction is highly endothermic. In another type of reactor a partial oxidation reaction is carried out by reacting a hydrocarbon fuel in the presence of oxygen on a catalyst to produce carbon monoxide and hydrogen. The partial oxidation reaction is exothermic. Another possibility for reforming hydrocarbons is an autothermal reformer that combines catalytic partial oxidation and steam reforming wherein exothermic partial oxidation supplies the heat of reaction required for endothermic steam reforming.

Autothermal reactors are particularly suitable for use in small scale, highly integrated fuel cell systems because fewer external components, such as heat sources or heat sinks, are required. However, the need still exists for reactors that more efficiently produce hydrogen and that may be used in a variety of fuel cell systems including small scale, highly integrated fuel cell systems.

SUMMARY OF THE INVENTION

This need is met by the present invention which provides methods and apparatus for producing hydrogen. The methods and apparatus utilize reforming catalysts in order to produce hydrogen gas.

In accordance with one embodiment of the present invention, a method for producing hydrogen gas from a fuel is provided. The method comprises providing an autothermal primary reactor having an inlet, an outlet, and at least one reforming reaction zone; providing at least one reforming catalyst in the at least one reforming reaction zone, wherein the at least one reforming catalyst comprises a platinum group metal on a support material, and wherein the support material comprises an oxidic support and a promoter comprising ceria and zirconia, passing a reactant mixture of hydrocarbon fuel, oxygen, and steam over the at least one reforming catalyst to produce product gases, one of the product gases comprising hydrogen. The method may further comprise subjecting the product gases to a water-gas shift reaction to convert carbon monoxide and water in the product gases to carbon dioxide leaving additional hydrogen. The method may further comprise subjecting the product gases to a final-stage scrubber to reduce carbon monoxide concentration in the product gases. The method may further comprise subjecting the product gases to a fuel cell stack to generate electricity.

In accordance with another embodiment of the present invention, a method for producing hydrogen gas from a fuel is provided. The method comprises providing an autothermal primary reactor having an inlet, an outlet, and at least one reforming reaction zone; providing at least one reforming catalyst in the at least one reforming reaction zone, wherein the at least one reforming catalyst comprises a platinum group metal on a support material, and wherein the support material comprises an oxidic support and a stabilizing material comprising neodymium; and passing a reactant mixture of hydrocarbon fuel, oxygen, and steam over the at least one reforming catalyst to produce product gases, one of the product gases comprising hydrogen. The stabilizing material may further comprise lanthanum, and the oxidic support material may comprise alumina.

In accordance with another embodiment of the present invention, a method for producing hydrogen gas from a fuel is provided. The method comprises providing an autothermal primary reactor having an inlet, an outlet, and at least one reforming reaction zone; providing at least one reforming catalyst in the at least one reforming reaction zone, wherein the at least one reforming catalyst comprises a platinum group metal on an oxidic support material and at least one Group IA, Group IIA, manganese, or iron metal promoter, passing a reactant mixture of hydrocarbon fuel, oxygen, and steam over the at least one reforming catalyst to produce product gases, one of the product gases comprising hydrogen.

In accordance with another embodiment of the present invention, an apparatus for producing hydrogen gas from a fuel comprises an autothermal primary reactor having an inlet adapted to receive a reactant stream comprising a hydrocarbon fuel, oxygen, and steam and an outlet adapted to provide product gases, one of the gases comprising hydrogen. The apparatus has at least one reforming reaction zone situated between the inlet and the outlet and at least one reforming catalyst in said at least one reforming reaction zone. The at least one reforming catalyst comprises a platinum group metal on a support material, and the support material comprises an oxidic support and promoter comprising ceria and zirconia.

In accordance with another embodiment of the present invention, an apparatus for producing hydrogen gas from a fuel comprises an autothermal primary reactor having an inlet adapted to receive a reactant stream comprising a hydrocarbon fuel, oxygen, and steam and an outlet adapted to provide product gases, one of the gases comprising hydrogen. The apparatus has at least one reforming reaction zone situated between the inlet and the outlet and at least one reforming catalyst in said at least one reforming reaction zone. The at least one reforming catalyst comprises a platinum group metal on a support, and the support comprises an oxidic support and a stabilizing material comprising neodymium. The stabilizing material may further comprise lanthanum.

In accordance with another embodiment of the present invention, an apparatus for producing hydrogen gas from a fuel comprises an autothermal primary reactor having an inlet adapted to receive a reactant stream comprising a hydrocarbon fuel, oxygen, and steam and an outlet adapted to provide product gases, one of the gases comprising hydrogen. The apparatus has at least one reforming reaction zone situated between the inlet and the outlet and at least one reforming catalyst in said at least one reforming reaction zone. The at least one reforming catalyst comprises at least one platinum group metal on an oxidic support material and at least one Group IA, Group IIA, manganese, or iron metal promoter.

In accordance with yet another embodiment, a method for producing hydrogen gas from a fuel is provided. The method comprises providing an autothermal primary reactor having an inlet, an outlet, a first reforming reaction zone, and a second reforming reaction zone, wherein the first reforming reaction zone is proximate to the inlet and the d second reforming reaction zone is proximate to the outlet; providing at least one upstream reforming catalyst in the first reforming reaction zone, wherein the at least one upstream reforming catalyst is selected to perform optimally in conjunction with operating conditions in the first reforming reaction zone; providing at least one downstream reforming catalyst in the second reforming reaction zone, wherein the at least one downstream reforming catalyst is selected to perform optimally in conjunction with operating conditions in the second reforming reaction zone; and passing a reactant mixture of hydrocarbon fuel, oxygen, and steam through the first and second reforming reaction zones such that reforming reactions occur therein, thereby forming product gases, one of which comprises hydrogen.

In accordance with another embodiment, an apparatus for producing hydrogen gas from a fuel comprises an autothermal primary reactor having an inlet adapted to receive a reactant stream comprising a hydrocarbon fuel, oxygen, and steam and an outlet adapted to provide product gases, one of said gases comprising hydrogen. The apparatus has a first reforming reaction zone proximate to the inlet and a second reforming reaction zone proximate to the outlet. At least one upstream reforming catalyst is contained in the first reforming reaction zone, and the at least one upstream reforming catalyst is selected to perform optimally in conjunction with operating conditions in the first reforming reaction zone. At least one downstream reforming catalyst is contained in the second reforming reaction zone, and the at least one downstream reforming catalyst is selected to perform optimally in conjunction with operating conditions in the second reforming reaction zone.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
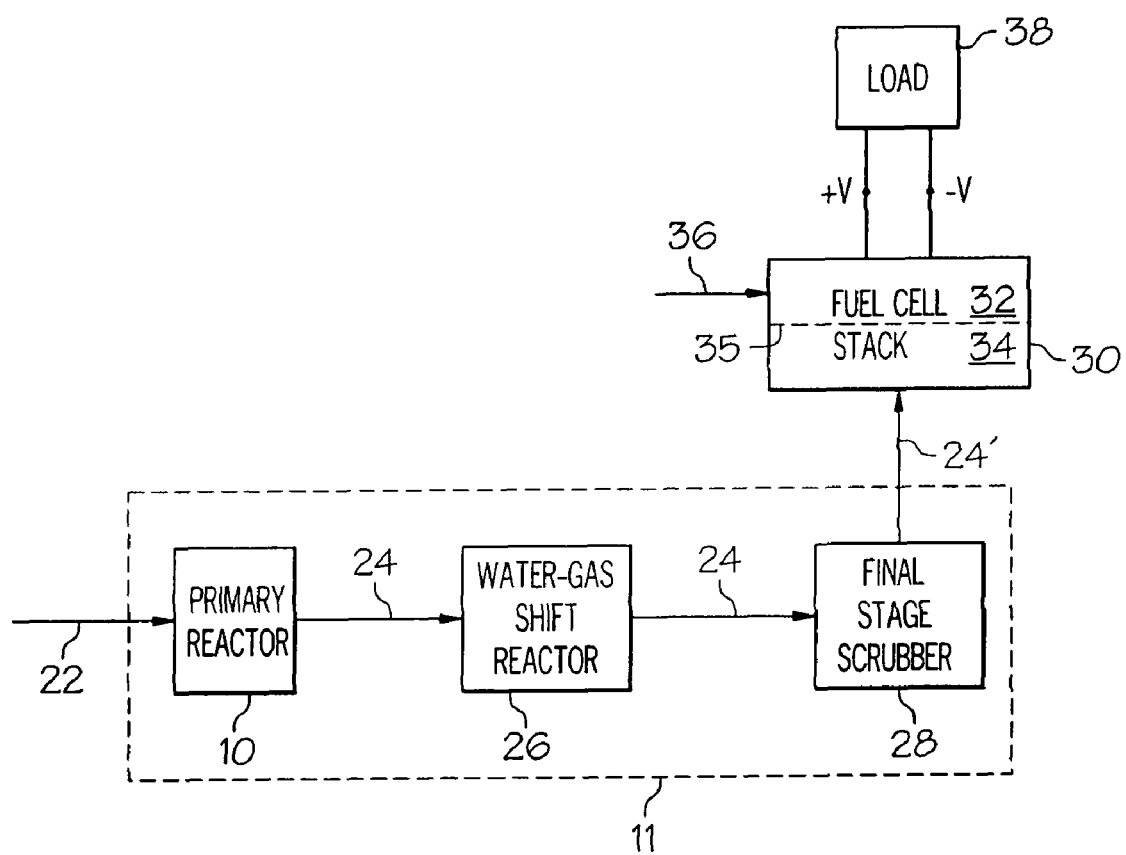
FIG. 1 is a schematic illustration of a fuel processing system and fuel cell stack.

FIG. 1 illustrates an exemplary fuel cell system comprising a fuel processing system 11 with a primary reactor 10, a water-gas shift reactor 26, and a final stage scrubber 28. The fuel processing system 11 provides the fuel cell stack 30 with a source of hydrogen. In the primary reactor 10, a reactant mixture 22 that may contain a hydrocarbon fuel stream and an oxygen-containing stream is flowed into the primary reactor 10. The oxygen-containing stream may comprise air, steam, and combinations thereof. The reactant mixture 22 may be formed by mixing a hydrocarbon fuel with a preheated air and steam input stream before flowing the reactant mixture into the primary reactor. After the reactant mixture 22 is flowed into the primary reactor 10, the reactant mixture 22 passes over at least one reaction zone having at least one reforming catalyst and product gas stream 24 containing hydrogen is produced catalytically. The primary reactor 10 is generally an autothermal reactor in which hydrogen is produced by combined catalytic partial oxidation and steam reforming reactions but may alternatively comprise any suitable reactor configuration.

In one embodiment, the product gas stream 24 exiting the primary reactor 10 may comprise hydrogen, carbon dioxide, carbon monoxide, and trace compounds, and water in the form of steam. To reduce carbon monoxide and increase efficiency, product gas stream 24 may enter a water gas-shift reactor 26. Oxygen from introduced water converts the carbon monoxide to carbon dioxide leaving additional hydrogen. For optimum efficiency, the water gas-shift reactor 26 may run with an inlet temperature between about 250° C. and about 400° C. The reduction of carbon monoxide to acceptable concentration levels takes place in the final stage scrubber 28. For example, air may be added to the final stage scrubber 28 to supply the oxygen needed to convert most of the remaining carbon monoxide to carbon dioxide. Alternatively, carbon monoxide in the product gas stream 24 may be absorbed by a carbon monoxide absorbing material provided in the final stage scrubber 28 and may be swept out by purge gases with variable pressure. The operating temperatures in the final stage scrubber 28 may range from about 50° C. to about 200° C.

The carbon monoxide purged product stream 24' exiting the final stage scrubber 28 is then fed into a fuel cell stack 30. As used herein, the term fuel cell stack refers to one or more fuel cells to form an electrochemical energy converter. As is illustrated schematically in FIG. 1, the electrochemical energy converter may have an anode side 1 and a cathode side 32 separated by diffusion barrier layer 35. The carbon monoxide purged product stream 24' is fed into the anode side 1 of the fuel cell stack 30. An oxidant stream 36 is fed into the cathode side 32. The hydrogen from the carbon monoxide purged product stream 24' and the oxygen from the oxidant stream 36 react in the fuel cell stack 30 to produce electricity for powering a load 38. A variety of alternative fuel cell designs are contemplated be present invention including designs that include a plurality of anodes 1, a plurality of cathodes 32, or any fuel cell configuration where hydrogen is utilized in the production of electricity.

Figure 2:
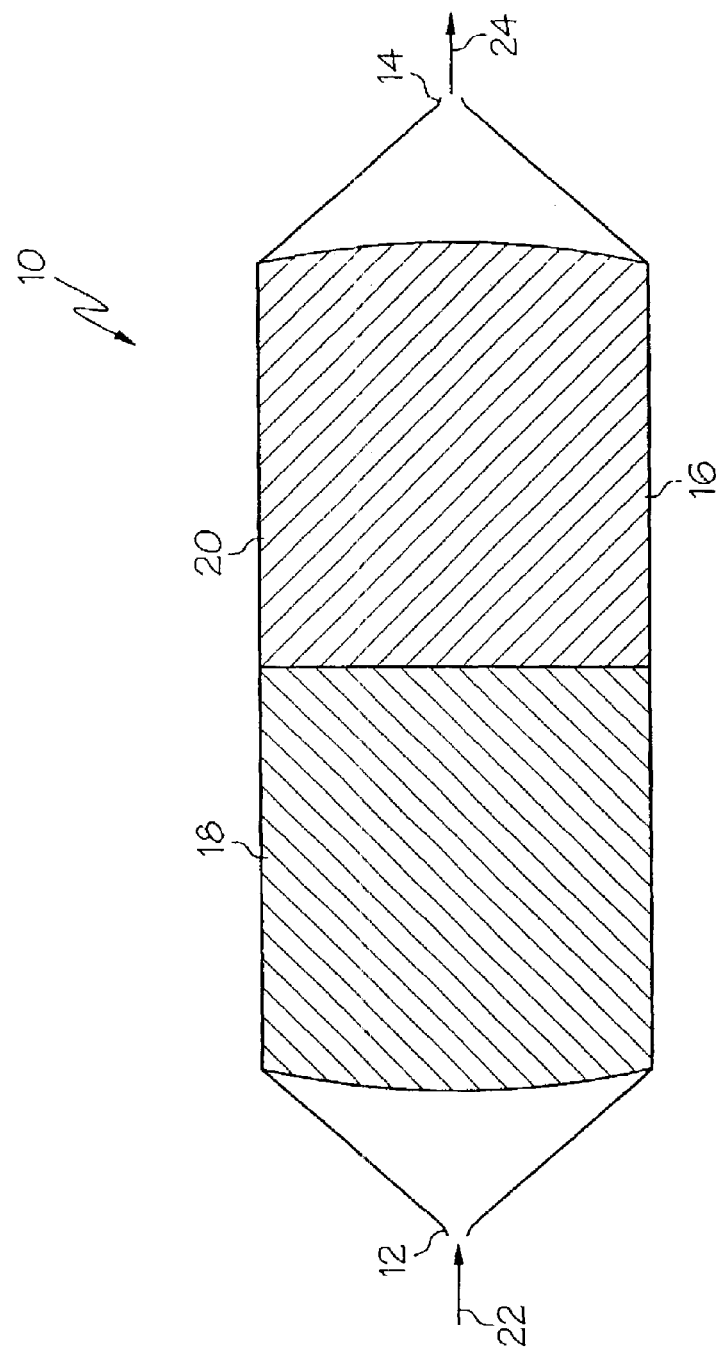
FIG. 2 is a schematic illustration of a primary reactor.

Referring to FIG. 2, a primary reactor 10 is illustrated schematically. The primary reactor 10 has an inlet 12, an outlet 14, and a reforming reaction zone 16. A reactant mixture 22 may enter the primary reactor 10 through the inlet 12. The reforming reaction zone 16 generally contains at least one reforming catalyst. The reactant mixture 22 generally passes through the reforming reaction zone 16 over at least one reforming catalyst, and product gases 24 are catalytically produced. One of the product gases 24 comprises hydrogen, and the product gases 24 generally exit through the outlet 14. The outlet 14 may be adapted to provide product gases, one of which is hydrogen. The primary reactor 10 is generally an autothermal reactor. It will be understood by those having skill in the art that primary reactor 10 may be of any suitable structure that allows a reactant stream including a fuel to be directed through a fuel reforming zone including at least one reforming catalyst.

The reforming catalyst generally comprises at least one platinum group metal catalyst on an oxidic support. The term "reforming catalyst" as used herein includes catalysts, catalyst support materials, promoters, stabilizers, and the like. The oxidic support may be alumina, silica, titania, ceria, zirconia, or mixed oxides thereof. The reforming catalysts may be prepared using any suitable techniques. Preparation techniques for preparing supported catalysts are well known in the art. It will be understood by those having skill in the art that there may be more than one reforming catalyst in the reforming reaction zone 16.

In one embodiment, the reforming catalyst comprises platinum and rhodium on an oxidic support. For example, the rhodium and platinum may be supported on alumina or ceria zirconia. The rhodium and platinum may also be supported on alumina promoted with ceria zirconia as will be discussed hereinafter. The ratio of rhodium to platinum may be between about 10:1 to 1:10 and is more preferably between about 3:1 to 1:3. The reforming catalyst may have a lower light-off temperature than rhodium based reforming catalysts. A catalyst with a lower light-off temperature allows the primary reactor 10 to be started with a lower amount of energy input. Therefore, the reforming catalyst may provide fast light-off ability.

The reforming catalysts containing platinum and rhodium may be prepared using any suitable method. For example, co-impregnation may be used wherein suitable metal salts are made into a solution such that the volume of the solution is sufficient to fill the entire pore volume of the support material. The solution is added to the support material, and the mixture is mixed thoroughly and dried and calcined. Alternatively, the metal species may be impregnated sequentially. For example, the platinum may be impregnated subsequent to the rhodium. Another suitable method for preparing the reforming catalysts is co-deposition wherein the support material is dispersed in a slurry containing suitable metal salts. A base is added to the slurry to deposit the metals onto the support materials, and the catalyst is dried and calcined. It is generally preferable for the platinum and rhodium to be deposited together rather than be present as a physical mix.

In accordance with another embodiment, the reforming catalyst may comprise a platinum group metal on an oxidic support stabilized with neodymium, lanthanum, or combinations thereof. The neodymium and lanthanum are generally incorporated into the lattice structure of the support material. The neodymium, lanthanum, or neodymium and lanthanum are generally present in an amount of about 1% to about 8% by weight of the support material. The oxidic support material may be alumina, ceria zirconia, or any other suitable support. The presence of the stabilizing material in the support may enhance the thermal durability of the support and may assist the support in retaining porosity.

It will be understood by those having skill in the art that various formulations are possible for the reforming catalyst. For example, the reforming catalyst may comprise 1% rhodium supported on lanthanum stabilized alumina. The reforming catalyst may also comprise 1% or 2% rhodium supported on ceria zirconia that is lanthanum and neodymium stabilized. The reforming catalyst may comprise 2% rhodium on neodymium and lanthanum stabilized alumina that is promoted with 30% ceria zirconia as described herein.

The reforming catalyst containing lanthanum and neodymium stabilizers may be formed in any suitable manner. For example, the lanthanum and neodymium are generally incorporated into the support material before the catalyst metals are added to the support. The support material may be formed by co-precipitation wherein the support material is dispersed in a slurry containing suitable metal salts. A base is added to the slurry to precipitate the metals onto the support materials, and the catalyst is dried and calcined. The catalyst metals may be added to the support material containing lanthanum and neodymium by any suitable method such as impregnation.

In yet another embodiment, the reforming catalyst may comprise a platinum group metal on an oxidic support with a ceria and zirconia promoter deposited on the support. The oxidic support material may be alumina. The ceria and zirconia may comprise between about 10% to about 60% by weight of the support material, and the ceria and zirconia more generally comprise between about 20% to about 40% by weight of the support material. The ratio of ceria to zirconia in the reforming catalyst is generally between about 80:20 to about 20:80. The platinum group metal may comprise rhodium, and the rhodium may be present in an amount of about 1% to about 3% by weight of the reforming catalyst. The platinum group metal may also comprise platinum. The support material may be stabilized with lanthanum, neodymium or combinations thereof as described herein. The reforming catalyst having a support material promoted with ceria and zirconia may exhibit improved activity and the ability to reform large concentrations of hydrocarbon fuel.

It will be understood by those having skill in the art that the term promoter is not used herein to imply that the ceria and zirconia are incorporated into the structure of the support material. Rather, the term promoter is used to describe the action of the presence of ceria zirconia on the support material as promoting reforming reactions. The ceria and zirconia of the present invention are not generally incorporated into the structure of the support material. Instead, the ceria and zirconia are deposited on the support material.

It will be further understood by those having skill in the art that various formulations are possible for the reforming catalyst. For example, the reforming catalyst may comprise 1% rhodium supported on an alumina support with 10%, 20%, 30%, or 40% ceria zirconia by weight of the support. The ceria and zirconia may have a ratio of 75:25. Alternatively, the reforming catalyst may comprise 2% or 3% rhodium on an alumina support with 30% ceria zirconia by weight of the support, and the activity of the reforming catalyst may improve with increased rhodium loading. The reforming catalyst may comprise 1% or 2% rhodium on an alumina support and 30% of a ceria zirconia and be lanthanum neodymium stabilized, wherein the promoter and stabilizer are present in an atomic ratio of $Ce_{0.20}Zr_{0.73}Nd_{0.05}La_{0.02}$.

The reforming catalysts containing ceria and zirconia may be prepared in accordance with any suitable method. For example, the ceria and zirconia may be deposited on a support material by a sol-gel route. Sols of ceria and zirconia are stabilized by counter ions such as nitrate and acetate. The sols are added to a slurry of a support material, and a base such as a 1M ammonia solution is added to the slurry. The product is then washed several times and dried, e.g. at 120° C., and calcined, e.g. at 800° C.

In another embodiment, the reforming catalyst comprises a platinum group metal on a support promoted with a Group IA, Group IIA, manganese, or iron metal promoter. The atomic ratio of the Group IA, Group IIA, manganese, or iron metal promoter to the platinum group metal may be between about 10:1 to about 2:1. The promoter may be selected from iron, manganese, lithium, or potassium, and the support may comprise alumina. The Group IA, Group IIA, manganese or iron metal promoter may be incorporated into the structure of the support. The platinum group metal may comprise rhodium, and the platinum group metal may further comprise platinum as discussed above. Additionally, the support may be promoted with ceria zirconia as discussed above. The reforming catalysts may exhibit improved activity, durability, or a combination thereof. For example, the reforming catalysts may exhibit the ability to steam reform low concentrations of fuel and short chain hydrocarbons effectively.

It will be understood by those having skill in the art that the term promoter is not used herein to imply that the Group IA, Group IIA, manganese, or iron metal promoters are incorporated into the structure of the support material. Rather, the term promoter is used to describe the action of the presence of the Group IA, Group IIA, manganese, and iron metal promoters as promoting reforming reactions.

It will be understood by those having skill in the art, that various combinations are possible for a reforming catalyst comprising a platinum group metal on a support promoted with a Group IA, Group IIA, manganese or iron metal promoter. For example, when iron is chosen as the promoter, the reforming catalyst may comprise 1% rhodium on alumina promoted with iron. Alternatively, the reforming catalyst may comprise 0.32%, 1%, or 5% iron by weight of the reforming catalyst, and the reforming catalyst may further comprise 1% rhodium on alumina promoted with ceria zirconia. When manganese is chosen as the promoter, the reforming catalyst may comprise 1% rhodium on alumina promoted with manganese. When lithium is chosen as the promoter, the reforming catalyst may comprise lithium and 2% rhodium on alumina promoted with ceria zirconia. In this case, the atomic ratio of Li:Rh is 1:10. When potassium is chosen as the promoter, the reforming catalyst may comprise potassium and 2% rhodium on alumina promoted with ceria zirconia, and the atomic ratio of K:Rh is 1:10.

The reforming catalysts containing Group IA, Group IIA, manganese, or iron metal promoters may be prepared using any suitable method. For example, co-impregnation may be used wherein suitable metal salts are made into a solution such that the volume of the solution is sufficient to fill the entire pore volume of the support material. The solution is added to the support material, and the mixture is mixed thoroughly and dried and calcined. Alternatively, the metal species may be impregnated sequentially. For example, the platinum group metal may be impregnated subsequent to the Group IA, Group IIA, manganese, or iron metal promoter being impregnated. Another suitable method for preparing the reforming catalysts is co-deposition wherein the support material is dispersed in a slurry containing suitable metal salts. A base is added to the slurry to deposit the metals onto the support materials, and the catalyst is dried and calcined.

The reforming catalysts of the present invention may be carried on a carrier structure located in the reforming reaction zone 16. Any suitable carrier structure may be used. For example, referring to FIG. 3, a monolithic structure 40 is illustrated. The monolithic structure 40 generally has a body 42 and a plurality of channels 44 running through the body of 42. The channels 44 may be of any suitable shape and configuration, and the channels are generally designed to provide an increased surface area on which the reforming catalysts may be deposited. For example, the channels 44 are illustrated as having a honeycomb configuration. It will be understood by those having skill in the art that the number of channels 44 per unit area may be increased or decreased as desired and that the loading of the reforming catalyst onto the carrier structure 40 may be modified as desired. The monolithic structure 40 may be formed using any suitable material, including, but not limited to ceramic, metal, open-cell ceramic foam, open-cell metal foam, and combinations thereof. Methods of coating or depositing reforming catalysts on monolithic structures are well known in the art.

Referring again to FIG. 2, the primary reactor 10 may have first and second reforming reaction zones 18 and 20. The first reaction zone 18 is located proximate to the inlet 12, and the second reaction zone 20 is located proximate to the outlet 14. Generally, the reactant mixture 22 passes through the first reaction zone 18 before passing through the second reaction zone 20. The first reaction zone 18 has at least one upstream reforming catalyst contained therein. The second reaction zone 20 has at least one downstream reforming catalyst contained therein.

The first and second reforming reaction zones 18, 20 generally are not subject to the same operating conditions. For example, the first reaction zone 18 may operate at a higher temperature than the second reaction zone 20. Additionally, the concentration of the reactant mixture 22 may be highest in the first reaction zone 18, and more large hydrocarbons may be present in the first reaction zone. The reforming reaction starts in the first reaction zone 18, and it may be desirable for the reforming reaction to light-off quickly to aid in a fast start-up of the primary reactor 10. Because the first and second reaction zones 18, 20 may operate under different conditions, the upstream reforming catalyst may be selected to perform optimally under the conditions of the first reaction zone 18. Similarly, the downstream reforming catalyst may be selected to perform optimally under the conditions of the second reaction zone 20. When the upstream and downstream reforming catalysts are selected to perform optimally, they may have a synergistic effect on the operation of the primary reactor 10 and improve the efficiency of the primary reactor.

The upstream reforming catalyst is generally selected to have fast light-off ability, thermal durability, or the ability to reform high concentrations of fuel. Additionally, the upstream reforming catalyst may be selected to have one or more of the above properties. It will be understood that the first reforming catalyst may comprise more than one reforming catalyst, and it will be further understood that each reforming catalyst may have one or more of the properties listed above. Therefore, more than one upstream catalyst may be present, and the upstream catalysts may have different properties or more than one property. Any suitable catalyst having the desired property or properties may be used.

In one embodiment, one of the upstream reforming catalysts may be a platinum and rhodium catalyst on an oxidic support as already described herein. This catalyst provides fast light-off ability. In another embodiment, one of the upstream reforming catalysts may comprise a platinum group metal on an oxidic support stabilized with lanthanum, neodymium, or combinations thereof as described herein. This catalyst provides thermal durability. In another embodiment, one of the upstream catalysts may comprise a platinum group metal on an oxidic support promoted with ceria and zirconia as described herein. This catalyst provides the ability to reform large concentrations of fuel. It will be understood that these reforming catalysts may be combined as desired. For example, in one embodiment, the catalyst may comprise at least one platinum group metal on a support stabilized with lanthanum, neodymium, or combinations thereof and promoted with ceria and zirconia.

The downstream reforming catalyst may be any suitable catalyst that performs well under the conditions of the second reaction zone 20. It will be understood that the downstream reforming catalyst may be more than one catalyst having one or more different properties. In one embodiment, the downstream reforming catalyst may comprises a platinum group metal on an oxidic support with at least one Group IA, Group IIA, manganese or iron metal promoter as described herein. This catalyst provides the ability to reform low concentrations of fuel.

Figure 3:
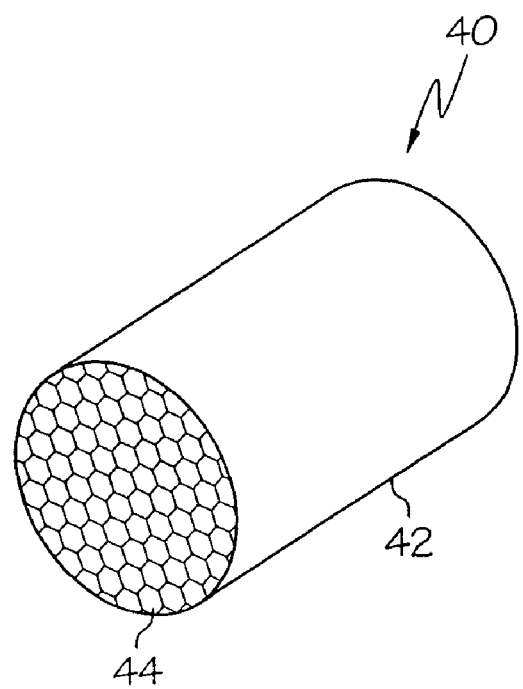
FIG. 3 is an illustration of a monolithic structure.
Figure 4:
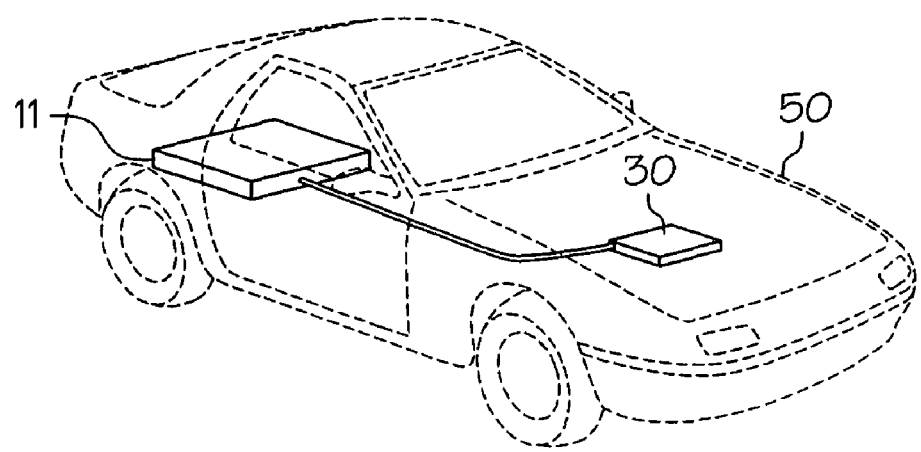
FIG. 4 is a schematic illustration of a vehicle having a fuel processing system and a fuel stack.

The first and second reaction zones 18, 20 may be defined by a monolithic structure 40 as illustrated in FIG. 3. The monolithic carrier may be a single body 42 defining the first and second reaction zones 18, 20. Alternatively, the first reaction zone 18 may be defined by a first monolithic structure, and the second reaction zone 20 may be defined by a second monolithic structure. It will be understood by those having skill in the art that the first and second monolithic structures may have the same number of channels 44 or different numbers of channels. The upstream and downstream catalysts may be coated on the monolithic structure in any suitable manner.

A method for producing hydrogen gas from a fuel may comprise providing an primary reactor having an inlet, an outlet, and at least one reforming reaction zone; providing a least one reforming catalyst in the reforming reaction zone; directing a hydrocarbon fuel stream into the reactor; and flowing an oxygen-containing stream into the reactor, such that the fuel stream and the oxygen-containing stream are exposed to the reforming reaction zone and a reforming reaction occurs, thereby forming product gases, one of which is hydrogen. The method may comprise providing an autothermal primary reactor having an inlet, an outlet, and at least one reforming reaction zone; providing at least one reforming catalyst in the least one reforming reaction zone; passing a reactant mixture of hydrocarbon fuel, oxygen, and steam over the reforming catalyst to produce product gases, one of said product gases comprising hydrogen. The method may further comprise providing an autothermal primary reactor having an inlet, an outlet, a first reforming reaction zone proximate to the inlet, a second reforming reaction zone proximate to the outlet; providing at least one upstream reforming catalyst in the first reforming reaction zone; providing at least one downstream reforming catalyst in the second reforming reaction zone; and passing a reactant mixture of hydrocarbon fuel, oxygen, and steam through the first and second reforming reaction zones such that reforming reactions occur therein, thereby forming product gases, one of which comprises hydrogen.

Referring to FIGS. 1, 2, and for, the fuel processing system 11 of the present invention may be used to provide a vehicle body 50 with motive power. The fuel processing system 11 may provide at least one fuel stack 30 with a source of hydrogen gas. The fuel stack 30 may be utilized to at least partially provide the vehicle body 50 with motive power. It will be understood by those having skill in the art that fuel stack 30 and fuel processing system 11 are shown schematically and may be used or placed in any suitable manner within the vehicle body 50.

It will be obvious to those skilled in the art that various changes may be made without departing from the scope of the invention, which is not to be considered limited to what is described in the specification.

What is claimed is:

1. A fuel cell system comprising:
    an autothermal reactor for producing hydrogen gas from a fuel, said autothermal reactor comprising:
    a reactant mixture inlet for a reactant mixture comprising a hydrocarbon fuel, oxygen, and steam and a product gas outlet;
    a first reforming reaction zone for reacting said reactant mixture to produce said hydrogen gas, said first reforming reaction zone proximate to said reactant mixture inlet, said first reforming reaction zone including an upstream reforming catalyst disposed therein, said upstream reforming catalyst comprising a platinum group metal on a support material, wherein said support material comprises an oxidic support, a promoter comprising ceria and zirconia, and a stabilizing material comprising lanthanum, neodymium, and combinations thereof, said platinum group metal consisting essentially of platinum and rhodium in a platinum-to-rhodium ratio sufficient to lower a light-off temperature of said upstream reforming catalyst below that of a substantially platinum-free rhodium based catalyst; and
    a second reforming reaction zone for reacting said reactant mixture to produce said hydrogen gas, said second reforming reaction zone downstream from said first reforming reaction zone, said second reforming reaction zone proximate to said first reforming reaction zone, and said second reforming reaction zone proximate to said product gas outlet, said second reforming reaction zone including a downstream reforming catalyst disposed therein, said downstream reforming catalyst comprising a platinum group metal on an oxidic support material and a first promoter comprising at least one Group I, manganese, or iron metal and a second promoter comprising ceria zirconia, said platinum group metal consisting essentially of rhodium, said upstream reforming catalyst having a faster light-off ability than said downstream reforming catalyst, said first reforming reaction zone at a higher temperature than said second reforming reaction zone, wherein said hydrogen gas, carbon dioxide, and carbon monoxide from said first and second reforming reaction zones exit through said product gas outlet;
    a water-gas shift reactor positioned after said autothermal reactor, said hydrogen gas, carbon dioxide, and carbon monoxide from said product gas outlet being a feed stream for said water-gas shift reactor, a portion of said carbon monoxide being converted into carbon dioxide in said water-gas shift reactor forming a carbon monoxide purged product stream containing said hydrogen; and
    a fuel cell stack positioned after said water-gas shift reactor, said carbon monoxide purged product stream containing said hydrogen being a feed stream for said fuel cell stack.

2. The apparatus as claimed in claim 1 wherein said first reforming reaction zone has a concentration of fuel that is higher than a concentration of fuel in said second reforming reaction zone.

3. The apparatus as claimed in claim 1 wherein said first and second reaction zones are defined by a monolithic structure.

4. The apparatus as claimed in claim 3 wherein said monolithic structure is made from ceramic, metal, open-cell ceramic foam, open-cell metal foam and combinations thereof.

5. The apparatus as claimed in claim 1 wherein said first reaction zone is defined by a first monolithic structure, and wherein said second reaction zone is defined by a second monolithic structure.

6. The apparatus as claimed in claim 1 wherein said ratio of platinum to rhodium is between 1:10 and 10:1.

7. The apparatus as claimed in claim 6 wherein said ratio of platinum to rhodium is between 1:3 and 3:1.

8. The apparatus as claimed in claim 1 wherein said oxidic support is alumina.

9. The apparatus as claimed in claim 1 wherein said stabilizing material is present in an amount of about 1% to about 8% by weight of said support material.

10. The apparatus as claimed in claim 9 wherein said oxidic support is alumina.

11. The apparatus as claimed in claim 1 wherein said promoter in said upstream reforming catalyst comprises between about 10% and about 60% by weight of said support material.

12. The apparatus of claim 1 wherein a ratio of ceria to zirconia is between about 80:20 to about 20:80.

13. The apparatus of claim 1 wherein an atomic ratio of the Group IA, manganese, or iron metal promoter to rhodium is between about 10:1 to about 2:1.

14. The apparatus of claim 1 wherein said oxidic support of said downstream reforming catalyst further comprises about 10 to about 60% of a ceria zirconia promoter.

15. The apparatus of claim 1 wherein said oxidic support of said downstream reforming catalyst further comprises about 1 to about 8% of a stabilizing material comprising lanthanum, neodymium, and combinations thereof.

16. A fuel cell system comprising:
a fuel cell stack provided with a source of hydrogen gas; and
a fuel processing system for providing said hydrogen gas, said fuel processing system comprising an autothermal primary reactor and a water-gas shift reactor wherein:
said autothermal primary reactor has a reactant mixture inlet for a reactant mixture comprising a hydrocarbon fuel, oxygen, and steam and a product gas outlet,
said autothermal primary reactor has a first reforming reaction zone for reacting said reactant mixture to produce said hydrogen gas, said first reforming reaction zone proximate to said reactant mixture inlet,
said autothermal primary reactor has a second reforming reaction zone for reacting said reactant mixture to produce said hydrogen gas, said second reforming reaction zone downstream from said first reforming reaction zone, said second reforming reaction zone proximate to said first reforming reaction zone, and said second reforming reaction zone proximate to said product gas outlet such that a product gas stream exiting said first reforming reaction zone subsequently enters said second reforming reaction zone,
said autothermal primary reactor has at least one upstream reforming catalyst, said upstream reforming catalyst comprised of a platinum group metal on a support material, wherein said support material comprises an oxidic support, a promoter comprising ceria and zirconia, and a stabilizing material comprising lanthanum, neodymium, and combinations thereof, said platinum group metal consisting essentially of platinum and rhodium in said first reforming reaction zone with a ratio of platinum to rhodium to lower a light-off temperature of said upstream reforming catalyst below that of a substantially platinum-free rhodium based reforming catalyst, and
said autothermal primary reactor has at least one downstream reforming catalyst in said second reforming reaction zone, said downstream reforming catalyst comprising a platinum group metal on an oxidic support material and a first promoter comprising at least one Group I, manganese, or iron metal and a second promoter comprising ceria zirconia, said platinum group metal consisting essentially of rhodium, said upstream reforming catalyst having a faster light-off ability than said downstream reforming catalyst, said first reforming reaction zone at a higher temperature than said second reforming reaction zone, and wherein said hydrogen gas, carbon dioxide, and carbon monoxide from said first and second reforming reaction zones exit through said product gas outlet;
said water-gas shift reactor being positioned after said autothermal reactor, said hydrogen gas, carbon dioxide, and carbon monoxide from said product gas outlet being a feed stream for said water-gas shift reactor, a portion of said carbon monoxide being converted into carbon dioxide in said water-gas shift reactor forming a carbon monoxide purged product stream containing said hydrogen; and
said fuel cell stack positioned after said water-gas shift reactor, said carbon monoxide purged product stream containing said hydrogen being a feed stream for said fuel cell stack.

17. The fuel cell system as claimed in claim 16 wherein said ratio of platinum to rhodium is between 1:10 and 10:1.

18. The fuel cell system as claimed in claim 17 wherein said ratio of platinum to rhodium is between 1:3 and 3:1.

19. The fuel cell of claim 16 wherein an atomic ratio of the Group IA, manganese, or iron metal promoter to rhodium is between about 10:1 to about 2:1.

20. The fuel cell of claim 16 wherein said oxidic support of said downstream reforming catalyst further comprises about 10 to about 60% of a ceria zirconia promoter.

21. The fuel cell of claim 16 wherein said oxidic support of said downstream reforming catalyst further comprises about 1 to about 8% of a stabilizing material comprising lanthanum, neodymium, and combinations thereof.

22. A vehicle comprising:
a vehicle body;
at least one fuel cell stack provided with a source of hydrogen gas, wherein said at least one fuel cell stack at least partially provides said vehicle body with motive power; and
a fuel processing system for providing said hydrogen gas, said fuel processing system comprising an autothermal primary reactor and a water-gas shift reactor wherein:
said autothermal primary reactor has a reactant mixture inlet for a reactant mixture comprising a hydrocarbon fuel, oxygen, and steam and a product gas outlet,
said autothermal primary reactor has a first reforming reaction zone for reacting said reactant mixture to produce said hydrogen gas, said first reforming reaction zone proximate to said reactant mixture inlet,
said autothermal primary reactor has a second reforming reaction zone for reacting said reactant mixture to produce said hydrogen gas, said second reforming reaction zone downstream from said first reforming reaction zone, said second reforming reaction zone proximate to said first reforming reaction zone, and said second reforming reaction zone proximate to said product gas outlet such that a product gas stream exiting said first reforming reaction zone subsequently enters said second reforming reaction zone,
said autothermal primary reactor has at least one upstream reforming catalyst, said upstream reforming catalyst comprised of a platinum group metal on a support material, wherein said support material comprises an oxidic support, a promoter comprising ceria and zirconia, and a stabilizing material comprising lanthanum, neodymium, and combinations thereof, said platinum group metal consisting essentially of platinum and rhodium in said first reforming reaction zone with a ratio of platinum to rhodium to lower a light-off temperature of said upstream reforming catalyst below that of a substantially platinum-free rhodium based reforming catalyst, and
said autothermal primary reactor has at least one downstream reforming catalyst in said second reforming reaction zone, said downstream reforming catalyst comprising a platinum group metal on an oxidic support material and a first promoter comprising at least one Group I, manganese, or iron metal and a second promoter comprising ceria zirconia, said platinum group metal consisting essentially of rhodium, said upstream reforming catalyst having a faster light-off ability than said downstream reforming catalyst, said first reforming reaction zone at a higher temperature than said second reforming reaction zone, and wherein said hydrogen gas, carbon dioxide, and carbon monoxide from said first and second reforming reaction zones exit through said product gas outlet;

said water-gas shift reactor being positioned after said autothermal reactor, said hydrogen gas, carbon dioxide, and carbon monoxide from said product gas outlet being a feed stream for said water-gas shift reactor, a portion of said carbon monoxide being converted into carbon dioxide in said water-gas shift reactor forming a carbon monoxide purged product stream containing said hydrogen; and said fuel cell stack positioned after said water-gas shift reactor, said carbon monoxide purged product stream containing said hydrogen being a feed stream for said fuel cell stack.

23. The vehicle as claimed in claim 22 wherein said ratio of platinum to rhodium is between 1:10 and 10:1.

24. The vehicle as claimed in claim 23 wherein said ratio of platinum to rhodium is between 1:3 and 3:1.

25. The vehicle of claim 22 wherein an atomic ratio of the Group IA, manganese, or iron metal promoter to rhodium is between about 10:1 to about 2:1.

26. The vehicle of claim 22 wherein said oxidic support of said downstream reforming catalyst further comprises about 10 to about 60% of a ceria zirconia promoter.

27. The vehicle of claim 22 wherein said oxidic support of said downstream reforming catalyst further comprises about 1 to about 8% of a stabilizing material comprising lanthanum, neodymium, and combinations thereof.

* * * * *